US 7,962,358 B1

(12) United States Patent
Fernandez et al.

(10) Patent No.: US 7,962,358 B1
(45) Date of Patent: Jun. 14, 2011

(54) INTEGRATED PROJECT AND STAFFING MANAGEMENT

(75) Inventors: Pramod B. Fernandez, Overland Park, KS (US); Scott J. Luebbert, Overland Park, KS (US); Mark R. Myzer, Overland Park, KS (US); Sandy L. Preston, Olathe, KS (US); Scott Skahan, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1068 days.

(21) Appl. No.: 11/557,092

(22) Filed: Nov. 6, 2006

(51) Int. Cl.
*G05B 19/418* (2006.01)
(52) U.S. Cl. .......................................... 705/8
(58) Field of Classification Search ................ 705/7
See application file for complete search history.

(56) References Cited

U.S. PATENT DOCUMENTS

| | | | |
|---|---|---|---|
| 5,185,780 A * | 2/1993 | Leggett | 379/265.08 |
| 5,907,490 A | 5/1999 | Oliver | |
| 5,911,134 A * | 6/1999 | Castonguay et al. | 705/9 |
| 5,918,207 A | 6/1999 | McGovern et al. | |
| 6,023,702 A * | 2/2000 | Leisten et al. | 1/1 |
| 6,049,776 A | 4/2000 | Donnelly et al. | |
| 6,405,364 B1 | 6/2002 | Bowman-Amuah | |
| 6,453,419 B1 * | 9/2002 | Flint et al. | 726/3 |
| 6,601,234 B1 | 7/2003 | Bowman-Amuah | |
| 6,671,818 B1 | 12/2003 | Mikurak | |
| 6,678,671 B1 * | 1/2004 | Petrovic et al. | 1/1 |
| 6,694,329 B2 | 2/2004 | Murray | |
| 6,738,736 B1 * | 5/2004 | Bond | 703/2 |
| 6,865,565 B2 | 3/2005 | Rainsberger et al. | |
| 6,904,593 B1 | 6/2005 | Fong et al. | |
| 6,964,044 B1 | 11/2005 | Hudson et al. | |
| 6,966,061 B1 * | 11/2005 | Vance et al. | 718/100 |
| 6,985,872 B2 | 1/2006 | Benbassat et al. | |
| 7,010,506 B1 * | 3/2006 | Menon et al. | 705/9 |
| 7,031,930 B2 | 4/2006 | Freeman et al. | |
| 7,085,728 B2 * | 8/2006 | Sarlay et al. | 705/9 |
| 7,139,720 B1 * | 11/2006 | Foell et al. | 705/8 |
| 7,191,139 B2 | 3/2007 | Roy et al. | |
| 7,403,925 B2 * | 7/2008 | Schlesinger et al. | 705/64 |
| 7,457,765 B2 * | 11/2008 | Thompson et al. | 705/9 |
| 7,539,627 B2 * | 5/2009 | Schmidt | 705/9 |
| 7,551,602 B2 * | 6/2009 | Whitman, Jr. | 370/352 |
| 7,552,208 B2 * | 6/2009 | Lubrecht et al. | 709/223 |
| 7,650,293 B2 * | 1/2010 | Kiran et al. | 705/8 |
| 7,664,664 B2 * | 2/2010 | King et al. | 705/7 |

(Continued)

OTHER PUBLICATIONS

Deltek.com Web Pages Deltek Systems, Inc., Mar. 2002, Retreived from Archive.org May 18, 2010.*

(Continued)

*Primary Examiner* — Scott L Jarrett

(57) ABSTRACT

A system and method for integrated resource and project planning are provided. A system for project forecast and resource forecast management integration includes a web-based Graphical User Interface (GUI) including an input component and a display component; wherein the input component receives project inputs relating to approved projects and proposed projects and further receives resource inputs relating to actual resources and placeholder resources. The system also includes a generation/analysis component that, based on the received inputs, generates a resource forecast of actual resources and placeholder resources, and generates a project forecast of approved projects and proposed projects. The system also includes a reporting component that generates a report on the resource forecast and the project forecast for display in the display component of the GUI; the reporting component generating the report for at least one of a resource level, a role level, and a project level.

16 Claims, 10 Drawing Sheets

U.S. PATENT DOCUMENTS

| | | | |
|---|---|---|---|
| 7,676,490 B1* | 3/2010 | Cassone et al. | 705/10 |
| 2001/0049615 A1* | 12/2001 | Wong et al. | 705/8 |
| 2002/0087377 A1* | 7/2002 | Rajasenan et al. | 705/7 |
| 2002/0178119 A1* | 11/2002 | Griffin et al. | 705/54 |
| 2002/0194101 A1* | 12/2002 | Moore et al. | 705/36 |
| 2003/0023597 A1* | 1/2003 | Ha et al. | 707/10 |
| 2003/0033184 A1 | 2/2003 | Benbassat et al. | |
| 2003/0125996 A1* | 7/2003 | Bush et al. | 705/7 |
| 2004/0006501 A1* | 1/2004 | Aviyants | 705/8 |
| 2004/0098294 A1* | 5/2004 | Dean et al. | 705/8 |
| 2004/0111509 A1* | 6/2004 | Eilam et al. | 709/224 |
| 2004/0123113 A1* | 6/2004 | Mathiassen et al. | 713/185 |
| 2004/0138897 A1* | 7/2004 | Eapen | 705/1 |
| 2004/0162753 A1* | 8/2004 | Vogel et al. | 705/10 |
| 2004/0230468 A1* | 11/2004 | King et al. | 705/10 |
| 2005/0004825 A1 | 1/2005 | Ehrler et al. | |
| 2005/0065837 A1 | 3/2005 | Kosiba et al. | |
| 2005/0096961 A1* | 5/2005 | Schaaf et al. | 705/9 |
| 2005/0240465 A1* | 10/2005 | Kiran et al. | 705/10 |
| 2006/0122875 A1* | 6/2006 | Kolbe | 705/8 |
| 2006/0184414 A1* | 8/2006 | Pappas et al. | 705/10 |
| 2007/0083416 A1* | 4/2007 | Podrazhansky | 705/9 |
| 2007/0260502 A1* | 11/2007 | Motwani et al. | 705/9 |
| 2007/0276674 A1 | 11/2007 | Hemmat | |

OTHER PUBLICATIONS

Pyron, Tim et al., Special Edition: Using Microsoft Project 2000 Que, Sep. 2000.*

New Software Automates Project Planning, Budgeting & Forecasting in Project Based Organization—Deltek SYstems' Deltek Project Planner—Product Information, EDP Weekly's IT Monitor, Mar. 5, 2001.*

PrimeTime F&S User's Guide Version 1.3 Blue Pumpkin Software Inc., 1997/1998.*

Visual Staff Scheduler Pro—Version 3.0—User's Guide Atlas Business Solutions, Inc., 1996/1997.*

ScheduleSoft.com Web Pages Schedule Soft, Mar. 2003, Retrieved from Archive.org Jan. 31, 2006.*

Presenting Adaptiv WorkFORCE97 Dec. 1997, Retrieved from Archive.org Jun. 23, 2005.*

Melik, Rudolf et al., Professional Services Automation Wiley & Sons, Inc., 2002.*

Primavera Profession Services Primavera Systems, Inc. 2005.*

Cooper, Marjorie J. et al., Tying the pieces together: A normative framework for integrating sales and project operations Science Direct, Oct. 20, 2006.*

Hoffman, Stephen G., A Model to Forecast Civilian Personnel Inventory for the National Security Agency AFIT, Mar. 1998.*

Meehan, Robert H. et al., Forecasting Human Resources Requirements: A Demand Model Human Resource Planning, vol. 13, No. 4, 1990.*

Yale, Here T. et al., Determining the Size of the Temporary Workforce—An Inventory Model Approach Human Resource Planning, vol. 2,1 No. 2, 1998.*

Jorssen, Vernon G., Planning for Manpower Requirements: Staffplan—An Analytical Model International Journal of Manpower, vol. 10, No. 4, 1989.*

Parker, Sandra et al., A decision support system for personnel schedule in a manufacturing environment Computers & Industrial Engineering, vol. 27, No. 1-4, Sep. 1994.*

Advisory Action dated Jan. 14, 2010, U.S. Appl. No. 10/893,777, filed Jul. 16, 2004, 3 pages.

Office Action dated Nov. 28, 2008, U.S. Appl. No. 10/893,768, 16 pages.

Microsoft Corporation, Microsoft Project for Windows Feature Guide, United States of America, Microsoft Corporation 1990., 19 pages.

Issa, Philip et al., "Tool for Human Resource Forecasting", U.S. Appl. No. 10/893,768, filed Jul. 16, 2004.

Issa, Philip et al., "Workforce Management and Resource Planning Tool", U.S. Appl. No. 10/893,777, filed Jul. 16, 2004.

Hemmat, Merzad, "Defining and Sizing Feasible Approaches to Business Needs Within an Integrated Development Process", U.S. Appl. No. 10/429,615, filed May 5, 2003.

Microsoft Corporation, Microsoft Project for Windows Feature Guide, United States of America, Microsoft Corporation 1990, 24 pages.

Office Action dated Mar. 27, 2009, U.S. Appl. No. 10/893,777, filed Jul. 16, 2004, 37 pages.

Office Action (Final) dated May 11, 2009, U.S. Appl. No. 10/893,768, filed Jul. 16, 2004, 18 pages.

Virtual Boss® Construction Scheduling Software, "Gantt Chart," http://web.archive.org/web/20030212102804/www.virtualboss.net/screenshots/ganttchart.htm, Jun. 16, 2008, 3 pages, VirtualBoss Development Co.

Virtual Boss® Construction Scheduling Software, "On Screen Schedule," http://web.archive.org/web/20030212102842/www.virtualboss.net/screenshots/tasklistscreen.htm, Jun. 16, 2008, 3 pages, VirtualBoss Development Co.

Virtual Boss® Construction Scheduling Software, "Task Detail Screen," http://web.archive.org/web/20030222101024/www.virtualboss.net/screenshots/taskdetailscreen.htm, Jun. 16, 2008, 2 pages, VirtualBoss Development Co.

Virtual Boss® Construction Scheduling Software, "Printed Schedule," http://web.archive.org/web/20030212103111/www.virtualboss.net/screenshots/printedschedule.htm, Jun. 16, 2008, 3 pages, VirtualBoss Development Co.

Virtual Boss® Construction Scheduling Software, "Job Manager Main Screen," http://web.archive.org/web/20030407034444/www.virtualboss.net/screenshots/jobmanagerscreen.htm, Jun. 16, 2008, 2 pages, VirtualBoss Development Co.

Office Action dated Jun. 26, 2008, U.S. Appl. No. 10/893,768, 15 pages.

Microsoft Corporation, "Microsoft Project for Windows Feature Guide," United States of America, Microsoft Corporation 1990, 16 pages.

VirtualBoss, "VirtualBoss Construction Scheduling Software," http://articles.techpubic.com/5100-10878_11-1031576.html, Jun. 16, 2008, 3 pages.

TechRepublic; Microsoft Project tutorial, Duration and task types,: http://articles.techrepublic.com/5100-10878_11-1031576.html, Jun. 17, 2008, 4 pages.

McConnell, Steve, "The Software Manager's Toolkit," The Software, Jul./Aug. 2000, pp. 5-8.

Office Action dated Nov. 2, U.S. Appl. No. 10/893,777, filed Jul. 16, 2004, 41 pages.

Notice of Abandonment dated Dec. 8, 2009, U.S. Appl. No. 10/893,768, filed Jul. 16, 2004, 2 pages.

* cited by examiner

FIG. 5

INSERT ASSIGNMENT FOR JOHN DOE

ENTER SR: [D4303] — 602

SELECT LABOR SUPPLIER: [COMPANY ▼] — 604

SELECT FUNCTIONAL ROLE: [SOFTWARE DEVELOPER ▼] — 606

SELECT BEGINNING WEEK: [10/2/2005 ▼] — 608

ENTER NUMBER OF HOURS: [0] — 613

(SAVE>) (CANCEL>)

ENTER APPL ID: [1FP] — 612

ENTER ACTIVITY: [ ] (*OPTIONAL)

SELECT FORECAST OWNER: [OWNER NAME ▼] — 614

SELECT ENDING WEEK: [10/29/2005 ▼] — 610, 616

☐ PLEASE CHECK THE BOX IF YOU ARE ENTERING THE TOTAL HOURS. — 615

| SAFE HOME | PROJECT SUMMARY | PROJECT FORECAST | RESOURCE FORECAST | UPLOAD/DOWNLOAD | SUPPLIER ID | REPORTS | RESOURCE ADMIN |

RESOURCE ADMIN
ADD PLACEHOLDER
OVERRIDE RESOURCE
LOCK FORECAST
COPY FORECAST

ADD NEW PLACEHOLDER

SUPERVISOR: SUPERVISOR [SEARCH] — 622  PLEASE CLICK ON THE SEARCH BUTTON TO SELECT THE SUPERVISOR.
620

LAST NAME: ⎯⎯⎯ 626    FIRST NAME: ⎯⎯⎯ 626

TYPE:  ○ EMPLOYEE
       ⦿ CONTRACTOR  } 628    JOB START DATE: 09/29/05 — 630

[ADD >]

EXISTING PLACEHOLDERS

| PLACEHOLDER NAME | SUPERVISOR NAME | EMP/CONT | JOB START DATE |
|---|---|---|---|
| PLACEHOLDER, CONTRACTOR | SUPERVISOR NAME 1 | CONTRACTOR | 09/07/05 |
| PLACEHOLDER, CONTRACTOR -2 | SUPERVISOR NAME 1 | CONTRACTOR | 09/07/05 |
| PLACEHOLDER, EMPLOYEE -1 | SUPERVISOR NAME 2 | EMPLOYEE | 09/09/05 |
| CONTRACTOR, DEC | SUPERVISOR NAME 1 | CONTRACTOR | 09/09/05 |
| SCOTT, -MDM1919 | SUPERVISOR NAME 2 | EMPLOYEE | 09/27/05 |

LOGO     CONNECT | EDP PORTAL | CONTACT US | CHANGE PASSWORD | WHAT'S NEW | FAQ | TRAINING | LOG OUT

WELCOME TO SAFE USER NAME    PARENT SR NUMBER [ ] (SEARCH)

SAFE PROFILE | PROJECT SUMMARY | PROJECT FORECAST | RESOURCE FORECAST | UPLOAD/DOWNLOAD | SUPPLIER ID | REPORTS

☐ SELECT FOR PROFILE SETTING ▸ EXCEL EXPORT FORMATTED ▸ EXCEL EXPORT DATA ONLY (REFRESH) *PLEASE CLICK ON REFRESH BUTTON TO SEE UPDATES

RESOURCE FORECAST FOR [ RESOURCE ▾ ] (SEARCH>)

| SR | SUPPLIER ID | LBR SPLYR | FORECAST OWNER | ROLE | ACTIVITY | 1/22 | 1/29 | 2/05 | 2/12 | 2/19 | 2/26 | 3/05 | 3/12 | 3/19 | 3/26 | 4/02 |
|---|---|---|---|---|---|---|---|---|---|---|---|---|---|---|---|---|
| 706 | 708 | 710 | 712 | 714 | 716 | | | | | | | | | | | |
| | | | | | | | | FEB - 06 | | | | MAR - 06 | | | | |
| RESOURCE | (F) | | | | | 5 | 8 | 0 | 0 | 0 | 0 | 0 | 0 | 0 | 0 | |
| D4303 | XES | SPRT | OWNER1 | COMMUNICATIONS | | 0 | 0 | 0 | 0 | 0 | 0 | 0 | 0 | 0 | 0 | |
| P1000 | XXL | SPRT | OWNER2 | UNSPECIFIED | | 0 | 8 | 0 | 0 | 0 | 0 | 0 | 0 | 0 | 0 | |
| TOTAL FOR: RESOURCE | | | | | | 5 | 8 | 0 | 0 | 0 | 0 | 0 | 0 | 0 | 0 | |

INSERT UPDATES

*FIG. 8*

LOGO  CONNECT | EDP PORTAL | CONTACT US | FAQ | TRAINING | LOG OUT
WELCOME TO SAFE USER NAME   PARENT SR NUMBER [▼]  [SEARCH]

SAFE HOME | PROJECT SUMMARY | PROJECT FORECAST | RESOURCE FORECAST | UPLOAD/DOWNLOAD | SUPPLIER ID | REPORTS | RESOURCE ADMIN

PROJECT SUMMARY

PROJECT SUMMARY — 802
HOURS/BIS SUMMARY
BIS FORECAST

▶ EXCEL EXPORT — 822

| SR | APPL ID | LBR SPLYR | LOE | PTD | ETC | EAC | VAR | VAR % | VAR REASON |
|---|---|---|---|---|---|---|---|---|---|
| C7288 | ASS | SPRT | 8 | 21 | 0 | 21 | 13 | 162 | ▶ ADD VAR REASON |
| C7288 | ASS | IBM | 80 | 72 | 0 | 72 | -8 | -10 | ▶ ADD VAR REASON |
| C7288 | D1P | SPRT | 100 | 86 | 0 | 86 | -14 | -14 | ▶ ADD VAR REASON |
| C7288 | D1P | EDS | 214 | 152 | 0 | 152 | -62 | -29 | ▶ ADD VAR REASON |
| C7288 | D1P | IBM | 242 | 108 | 0 | 109 | -133 | -55 | ▶ ADD VAR REASON |
| C7288 | DKL | EDS | 5 | 5 | 0 | 5 | 0 | 0 | ▶ COMPLETE |
| C7288 | DKL | SPRT | 214 | 860 | 0 | 860 | 646 | 302 | ▶ ADD VAR REASON |
| C7288 | DKL | IBM | 3269 | 1579 | 0 | 1579 | -1690 | -52 | ▶ NET 0 CR |
| C7288 | GBP | SPRT | 370 | 234 | 576 | 810 | 440 | 119 | ▶ ADD VAR REASON |
| C7288 | HS | SPRT | 0 | 0 | 0 | 0 | 0 | 0 | ▶ ADD VAR REASON |
| C8565 | D1P | IBM | 139 | 25 | 0 | 25 | -114 | -82 | ▶ ADD VAR REASON |
| C8565 | D1P | SPRT | 525 | 261 | 147 | 408 | -117 | -23 | ▶ ACCEPTABLE |
| C8565 | DKL | SPRT | 126 | 125 | 0 | 125 | -1 | -1 | ▶ ADD VAR REASON |
| C8565 | DKL | IBM | 32 | 32 | 0 | 32 | 0 | 0 | ▶ ADD VAR REASON |
| C8565 | EPP | EDS | 0 | 0 | 4 | 4 | 4 | 0 | ▶ ADD VAR REASON |
| C8565 | GBP | SPRT | 610 | 182 | 350 | 532 | -78 | -13 | ▶ ACCEPTABLE |
| D3630 | 1FP | SPRT | 0 | 91 | 8 | 99 | 99 | 0 | ▶ ADD VAR REASON |
| D3630 | D1P | SPRT | 0 | 295 | 455 | 750 | 750 | 0 | ▶ ADJUST ACTUALS |
| D3630 | DKL | SPRT | 0 | 128 | 0 | 128 | 128 | 0 | ▶ ADD VAR REASON |

INTEGRATED PROJECT AND STAFFING MANAGEMENT

CROSS-REFERENCE TO RELATED APPLICATIONS

This application includes subject matter related to the following applications, each of which is hereby incorporated by reference:

U.S. patent application Ser. No. 10/893,768, filed Jul. 16, 2004, entitled "Tool for Human Resource Forecasting," by Issa, et al.

U.S. patent application Ser. No. 10/893,777, filed Jul. 16, 2004, entitled "Workforce Management and Resource Planning Tool," by Issa, et al.

U.S. patent application Ser. No. 10/429,615, filed May 5, 2003, entitled "Defining and Sizing Feasible Approaches to Business Needs within an Integrated Development Process," by Merzad Hemmat.

BACKGROUND

To achieve its goals, an enterprise might initiate various projects employing multiple individuals with diverse skills working in various groups under a common coordinator. The groups to which the individuals belong can be departments within the enterprise, third-party or in-house suppliers of services to the enterprise, providers of computing applications within the enterprise, or other similar groups. The common coordinator can be a single individual or a team of individuals. An individual or team that forecasts the amount of time likely to be needed by each of the individuals and/or groups to complete the project can be referred to as a forecast owner or a forecast provider. The forecast owner/provider may, in some embodiments, be the individual responsible for the accuracy of his or her forecasts in the system, and have some degree of control or authority over various projects and/or resources in his or her forecasts.

Additionally, such projects are generated and then completed in due course in a project management setting. A project may be proposed, analyzed for feasibility and cost, and various iterations may be considered before the project is ultimately approved. A project may additionally return to a proposed status if approval is withdrawn, the project is postponed, or the like. Project management is used to track progress towards completion of the project, and forecasted numbers may be compared to actual numbers as a check.

SUMMARY

These and other features and advantages will be more clearly understood from the following detailed description taken in conjunction with the accompanying drawings and claims.

A system and method for integrated resource and project planning are provided. A system for project forecast and resource forecast management integration includes a web-based Graphical User Interface (GUI) including an input component and a display component; wherein the input component receives project inputs relating to approved projects and proposed projects and further receives resource inputs relating to actual resources and placeholder resources. The system also includes a generation/analysis component that, based on the received inputs, generates a resource forecast of actual resources and placeholder resources, and generates a project forecast of approved projects and proposed projects. The system also includes a reporting component that generates a report on the resource forecast and the project forecast for display in the display component of the GUI; the reporting component generating the report for at least one of a resource level, a role level, and a project level.

A method is provided for project forecast and resource forecast management integration. The method can include receiving at a web-based GUI a plurality of inputs; wherein the inputs comprise project inputs relating to approved projects and proposed projects and resource inputs relating to actual resources and placeholder resources. The method can also include generating a resource forecast of actual resources and placeholder resources based on the received inputs. The method can also include generating a project forecast of approved projects and proposed projects based on the inputs. The method may additionally include generating a report on the resource forecast and the project forecast for at least one of a resource level, a role level, and a project level. The method can also include displaying the report in the web-based GUI.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

FIG. 5 shows an illustrative screen shot for building a user profile in accordance with some embodiments of the present disclosure.

FIG. 6 shows an illustrative screen shot of a screen in the tool for receiving one or more project inputs relating to a project in the computer-based system in accordance with some embodiments of the present disclosure.

FIG. 7 shows an illustrative screen shot of a screen in the tool forcreating one or more resource placeholders in the computer-based system in accordance with some embodiments of the present disclosure.

FIG. 8 shows an illustrative screen shot of a screen in the tool for reporting at the resource level in the computer-based system in accordance with some embodiments of the present disclosure.

FIG. 9 shows an illustrative screen shot of a screen in the tool for reporting at the project level in the computer-based system in accordance with some embodiments of the present disclosure.

DETAILED DESCRIPTION

Figure 1:
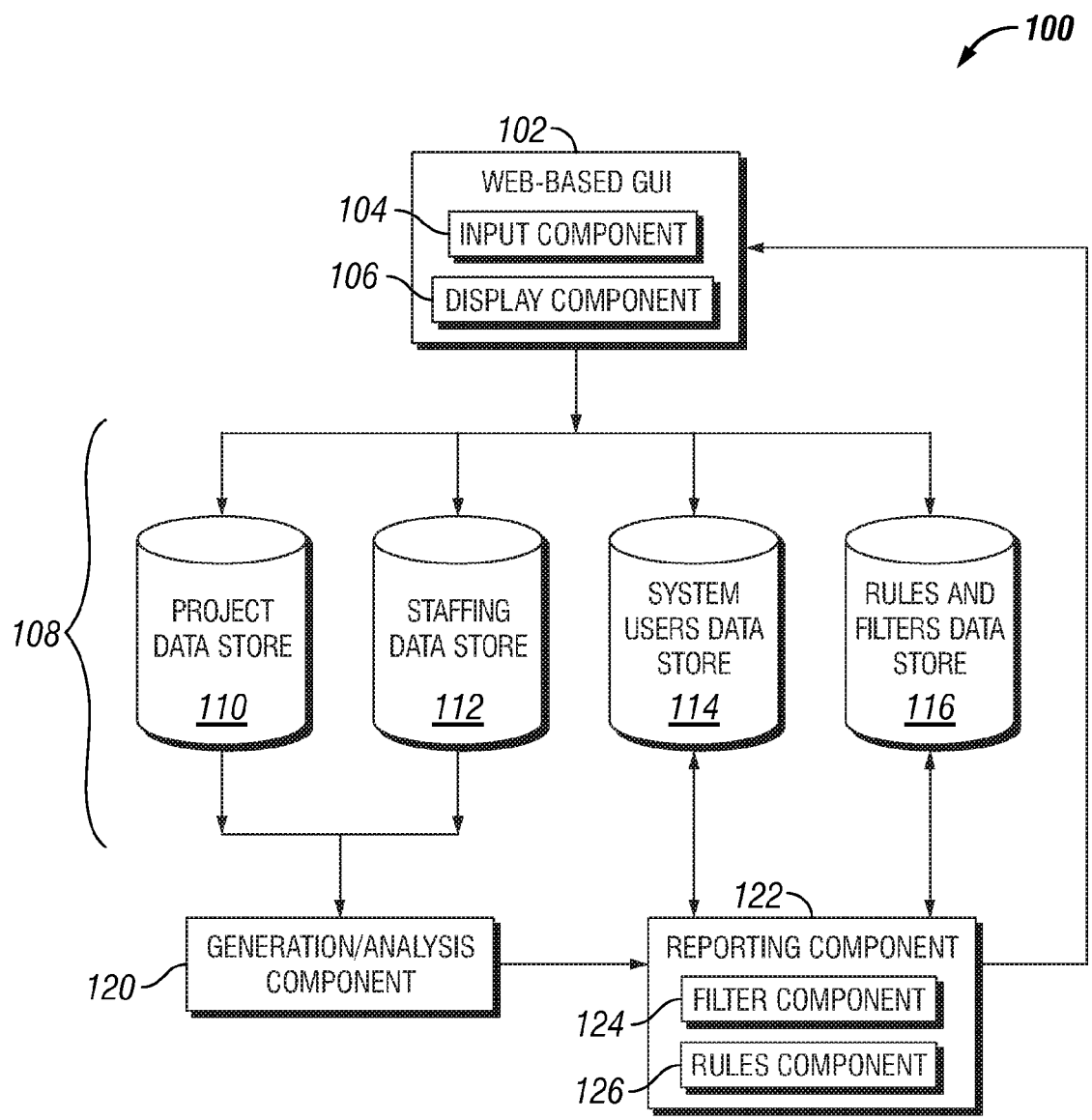
FIG. 1 shows a block diagram of a tool for resource forecast and project forecast management integration in a computer-based system in accordance with some embodiments of the present disclosure.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

I. OVERVIEW

The following disclosure is divided into six sections including this overview. Section II defines terminology used in this disclosure. Section III describes in detail a novel system and software tool that provides context and support for the project forecast and resource forecast management integration methods disclosed in the remaining sections.

It is desirable to combine the utility of a project management tool with the utility of project and resource forecasting in an integrated tool for efficiency, consistency, and the like. An integrated tool offers functionality not previously available in separate tools, such as more granular, specific reporting (such as at the individual resource level or project level), placeholders representing resources that may be added to the enterprise's pool of resources, and project forecasting for both approved and proposed projects, each which will be discussed herein.

Terminology

As used herein, the term "project forecast" refers to a project management plan that reflects for incomplete work an estimate of how resources are assigned to projects, the hours assigned for completion of projects, and scheduling for work on the projects. The project forecast also includes, for work already complete, the actual time and resources used to complete the projects. A project forecast may include both projects that are already approved as well as proposed projects. Project forecasts may provide the number of working hours likely to be spent by a resource (at the individual level or the group level) in a working week or month.

As used herein, the term "resource forecast" refers to a total capacity of resources available to the enterprise, which may be assessed in hours. A resource forecast may be used in assessing whether there is available capacity in work hours to complete anticipated projects. A resource forecast shows the individuals who report to each manager or who are assigned work tied to a forecast owner, the number of working hours in each upcoming week, month or other time period, and how many hours are available to be assigned to each individual resource who can fill a particular role in a project. The resource forecast may also show totals of assigned hours and available hours in a given time period (i.e., weekly, monthly) for all individual resources in a group that reports to the forecast owner/provider. The resource forecast may additionally show all the work (i.e., both approved and proposed) by an individual resource such that each individual resource may view what he or she should be working on, what may be required of the resource in the future, and the timeframes for both.

As used herein, the term "resource" refers to a person or team of people, assessed in number of Full Time Employee ("FTE") hours. An actual resource refers to an individual or team that is currently employed by or contracted for by the enterprise, while a placeholder resource refers to an existing resource or team or to a hypothetical individual or team or that may be added in the future. A resource may be classified according to status as an employee or a contractor, and may also be classified according to one or more skill sets. A contractor may be a temporary employee or employees of a third party outsource entity.

As used herein, the term "resource inputs" refers to inputs pertaining to each resource that may be used in generating the project forecast and/or resource forecast. Resource inputs may include, for example, a Resource Identifier (such as a name or employee number, one or more skill set(s), an hours input (i.e., hours per week, month, year, etc. that the resource is available), and a flag that indicates whether the resource is an actual resource or a placeholder resource.

As used herein, the term "resource role" refers to a unique set of skills, and is not necessarily equivalent to a job position or job title. Each project may include the various roles that will be filled in order to complete the project, and each role may then be assigned to a specific resource (individual or group). A given Resource may fulfill several roles (e.g., an analyst on one project, and a developer on another). The resource pool has some flexibility to project demands.

As used herein, the term "project" refers to an enterprise undertaking that will be completed by the resources managed by the enterprise. An approved project is a project that has advanced through the enterprise's project management and development processes sufficiently, and developed thoroughly, as to be granted approval for inclusion in the project forecasts and resource forecasts. For example, an approved project may have been through conceptual analysis, had high level estimates generated, undergone review by the business, third party suppliers have committed to the schedule, and the business has committed to fund the project. A proposed project, by comparison, is in the enterprise project management and development process, but has yet to obtain final approval. For example, a proposed project may only have undergone initial high level analysis, and the business and suppliers may not have made commitments yet to completing the project, leaving the proposed project at the stage of being simply a qualified proposal. A proposed project could also include a project for which final approval has been withdrawn, or a project temporarily postponed.

As used herein, the term "project inputs" refers to inputs pertaining to each project that may be used in generating the project forecast and/or resource forecast. Project inputs may include, for example, a project identifier (i.e., a service request or project card number), a scheduled timeframe, one or more impacted skill group(s), an hours input, one or more specific activity fields, and a flag that indicates whether the project is approved or proposed. The hours input for a project may be a weekly total and a project date range, and the system of the present disclosure applies a spreading algorithm to the hours input, such that the input hours are applied to each week in the project date range for the resource forecast and the project forecast. Alternatively, the hours input for a project may be a project total and a project date range, and the system of the present disclosure applies a spreading algorithm to the hours input to divide the hours input into a weekly total, and the weekly total is applied to each week in the project date range for the resource forecast and the project forecast.

As used herein, the term "resource level" refers to a view of a project forecast or resource forecast at the granular level of an individual resource. A "skill level" refers to a view of a project forecast or resource forecast at the granular level of a resource role. A "project level" refers to a view of a project forecast or resource forecast at the granular level of a particular project. The project forecast and resource forecast may be further filtered for a customized view as will be discussed herein.

As used herein, the term "forecast owner/provider" refers to an individual (or team of individuals) with the authority to enter, update, change, and/or delete projects and/or resources from the system. The forecast owner/provider is the individual or team that forecasts the time needed by individual resources and groups of resources to complete a project. Additionally, the forecast owner/provider formulates project plans by assigning specific resources, either as individuals or as groups, to particular projects.

II. SYSTEM ARCHITECTURE

An embodiment of the disclosure is a web-based system and tool for project forecast and resource forecast management integration. The system and tool carry out project management by facilitating forecasts of the amount of time necessary to complete various enterprise projects, and assigning resources, according to role, within each project. The system and tool further facilitate accurate staff planning based on resource forecasts. Functions such as project management and staff planning are integrated into a single tool for use across the enterprise.

Additionally, in the web-based system and tool of the present disclosure, more detailed and accurate resource forecasts and project forecasts may be generated because a forecast owner/provider may put in place placeholders that represent placeholder resources (i.e., a hypothetical individual or team that may be added to the enterprise's pool of resources in the future). Placeholder resources may be used to render the resource forecast and project forecast more accurate when it is reasonably anticipated that resources having at least a certain skill set and at least a certain number of hours available will be added to the pool of resources during a period of time. For example, placeholder resources may include temporary workers, contractors, seasonal employees, interns, and the like.

Additionally, in the web-based system and tool of the present disclosure, more detailed and accurate resource forecasts and project forecasts may be generated because a forecast owner/provider may enter proposed projects. By including proposed projects that are reasonably expected to be granted approval, an accurate project forecast may be obtained earlier in the planning process, when problems, contingencies or conflicts may be resolved ahead of time and without slowing down process on projects. Furthermore, the resource forecast may be more accurate in reflecting when new resources will be necessary based on proposed projects and approved projects.

Additionally, in the web-based system and tool of the present disclosure, a more granular approach may be taken towards project management and forecasting and resource staff planning. Specifically, the project forecast and the resource forecast may be viewed at various different (more granular levels) than previously available. Specifically, both the project forecast and the resource forecast may be viewed at the level of individual projects, individual resources, and specific roles.

A block diagram of an embodiment of the tool in a computer-based system is shown in FIG. 1. The system 100 includes a web-based Graphical User Interface (GUI) 102, various data stores 108, a generation analysis component 120 and a reporting component 122. The web-based GUI 102 includes an input component 104 that accepts various inputs from users. The various inputs will be discussed further below with respect to FIG. 2. The web-based GUI 102 also includes a display component 106 that displays various screens, including reports on project forecasts, resource forecasts, and the inputs, as will be discussed further below. The web-based GUI 102 is operably coupled to the various data stores 108 such that the inputs from the user into the input component 104 are stored in the various data stores 108.

The GUI 102, or series of screens, is used for display and entry of project-related, resource-related, system user-related, and filters and rules-related information. That is, project inputs, resource inputs, system user inputs, and rules and filters inputs can be entered and displayed in web pages that can be viewed in a web browser. The web pages can feature a dashboard layout wherein the same set of multiple selectable buttons appears on each page. For each button selected, a different menu of selectable links appears on the screen. Selection of each link in these menus causes a different workspace to appear in the remainder of the screen. Examples of the GUI 102 that might be used by the system 100 are shown in FIGS. 5-9.

Terms such as 'button', 'link', 'menu', 'icon', and the like are used herein in a broad sense to refer to regions within a graphical user interface that, upon selection, allow a user to view a different interface. The tool described herein would function in a similar manner regardless of the specific means used to navigate among the various interfaces.

The various data stores 108 include a project data store 110, a staffing data store 112, a system users data store 114, and a rules and filters data store 116. The project data store 110 stores the inputs pertaining to projects that are planned or anticipated by the enterprise. Project inputs stored in the project data store 110 are discussed further below with respect to FIG. 2. Project inputs stored in the project data store 110 may include data relating to both approved projects and proposed projects. The staffing data store 112 stores the inputs pertaining to resources that are employed by, contracted for, or anticipated by the enterprise. Resource inputs stored in the staffing data store 112 are discussed further below with respect to FIG. 2. The resource inputs stored in staffing data store 112 may include data relating to both actual resources and placeholder resources.

The system users data store 114 stores user identity inputs relating to each user authorized to access and use the system. The system users data store 114 may store, for example, a user identifier, passwords, and various user preferences. The system users data store 114 may additionally store each user's role(s), skill set(s), and any limitation (based on security or business hierarchy) on the authority of the user to access and/or edit data once stored in the system 100. The system users data store 114 is operably coupled to the reporting component 122.

The rules and filters data store 116 is operably coupled to the system users data store 114 and stores one or more input filters and one or more rules, wherein each filter and rule accesses the system users data store 114 to obtain the stored user identity, user preferences, roles, skill sets, and/or limitations to customize the system's display for each user. The rules and filters data store 116 is operably coupled to the reporting component 122.

The generation analysis component 120 is operably coupled to the project data store 110 and the staffing data store 112. The generation analysis component 120 may comprise, in various embodiments, software stored in memory that, when executed by a processor, causes the processor to (based on the inputs stored in the data stores), generate a resource forecast of actual resources and placeholder resources, and generate a project forecast of approved projects and proposed projects. The resource forecast and the project forecast may be generated by aggregating the inputs for all the projects and all of the resources in the system for an overall view, which may then be scaled down, limited, and/or customized as needed.

The generation analysis component 120 is operably coupled to the reporting component 122. The reporting component generates a report on the resource forecast and the project forecast for display in the display component of the GUI 102. The reporting component is operable to generate the report at various different levels of granularity. For example, for some purposes, a decision maker (who may be the forecast owner/provider or some other administrator, manager, or executive) may make the most use of a report at the resource level, such that he or she may examine the resource forecast for each individual resource (i.e., person), as well as examine the project forecast for each individual resource. In other circumstances, the decision maker may make the most use of a report at the role level, showing the resource forecast and project forecast for all individual resources that are assigned to specific roles. In still other circumstances, the most useful report for the decision maker may be at a project level, such that he or she may examine the relevant resource forecast and project forecast for a specific project, rather than the "big picture" of all enterprise projects.

Figure 2:
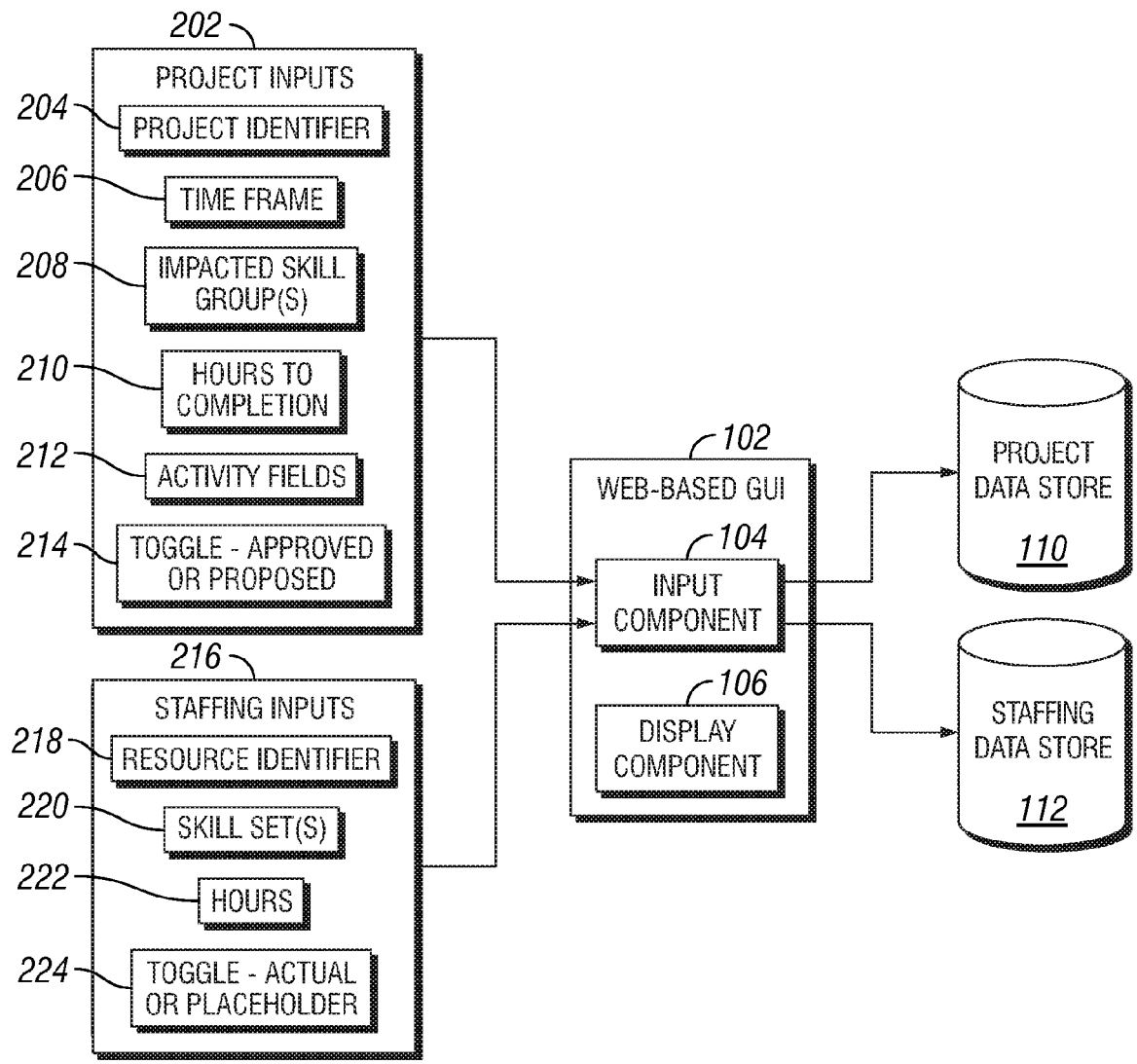
FIG. 2 illustrates various inputs to the tool of FIG. 1, in a computer-based system in accordance with some embodiments of the present disclosure.

FIG. 2 shows a block diagram of portions of the system shown in FIG. 1. The previously described project inputs, as shown in FIG. 2, may include one or more of the following: a project identifier 204 such as a name or alphanumeric code unique to the resource, a time frame 206 in which the project is planned to be completed, one or more impacted skill groups 208 from which resources will be drawn to complete the project, an hours input 210 (either a project total to completion or a weekly total), one or more specific activity fields 212 designating detailed actions that a given role will take in completion of the project, and a toggle 214 indicating that the project is approved or proposed. The input component 104 of the GUI 102 receives the project inputs and stores them in the project data store 110.

The previously described resource inputs, as shown in FIG. 2, may include one or more of the following: a resource identifier 218 such as a name or alphanumeric code unique to the resource, one or more skill sets 220 held by the resource, an hours input 222 (a total number of hours represented by the resource or a weekly available total), if the resource is assigned to any projects, the role 224 that the resource plays in each project, and a toggle 226 indicating that the resource is an actual resource or a placeholder resource. The input component 104 of the GUI 102 receives the resource inputs and stores them in the staffing data store 112. In various embodiments, the resource inputs may additionally include one or more roles that the resource can hold, and a proficiency rating for their skill sets. In various embodiments, the forecast owner/provider may be authorized to toggle a resource from placeholder to actual when the resource is added to the enterprise's pool of resources. In some embodiments, the resource inputs may further include a term of employment. The term may be used to ensure that terminated resources are not selected for assignment to projects outside of their term. A designation may appear in any report to flag or highlight any resource forecasted beyond their term. Likewise, term may be added to each user profile 324 to prevent terminated resources from logging in to the tool.

Figure 3:
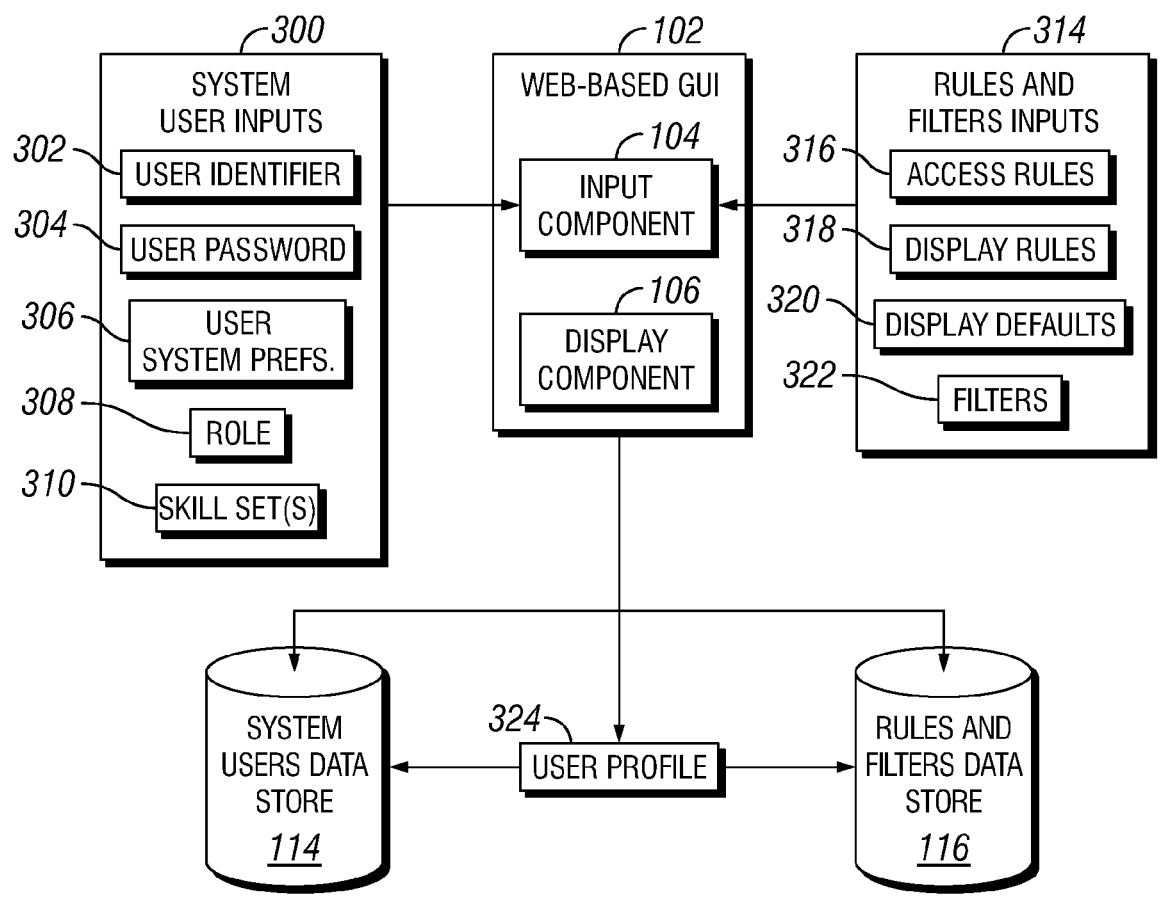
FIG. 3 illustrates various other inputs to the tool of FIG. 1, in a computer-based system in accordance with some embodiments of the present disclosure.

FIG. 3 shows a block diagram of portions of the system shown in FIG. 1. The previously described system user inputs 300, as shown in FIG. 3, may include one or more of the following: a user identifier 302 such as a name or alphanumeric code unique to the user (who may be a manager, administrator, executive, forecast owner/provider, or individual resource), a user password 304 that the user enters to gain access to the system over security measures, user system preferences 306 (i.e., defaults that the user may select to customize reports of resource forecasts and project forecasts in favorite views or reports commonly of interest to the user), roles 308 that the user currently fills or will fill in the future, and skill sets 310 held by the user. The input component 104 of the GUI 102 receives the system user inputs 300 and stores them in the system users data store 114.

The previously described rules and filters inputs 314, as shown in FIG. 3, may include one or more of the following: access rules 316 that limit access to specific reports based on identity, role, skill set, or other system user inputs 300 for security purposes or according to enterprise business hierarchy, display rules 318 that limit which portion(s) of the resource forecast or project forecast are displayed in various screens, display defaults 320 that indicate which project forecast and/or resource forecast is displayed and how if the user does not have any preferences stored and is not subject to limitations, and filters 322 that organize the reports to display the resource forecast and/or project forecast at a granular level such as project level, role level, or resource level. The input component 104 of the GUI 102 receives the rules and filters inputs 314 and stores them in the rules and filters data store 116.

The system user inputs 300 and the rules and filters inputs 314 together comprise a user profile 324 that indicates what information in the system the user has access to and how it is reported and displayed to the user. The user profile 324 built by each user upon logging in to the system, and may be updated or changed by the user at any time.

Figure 4:
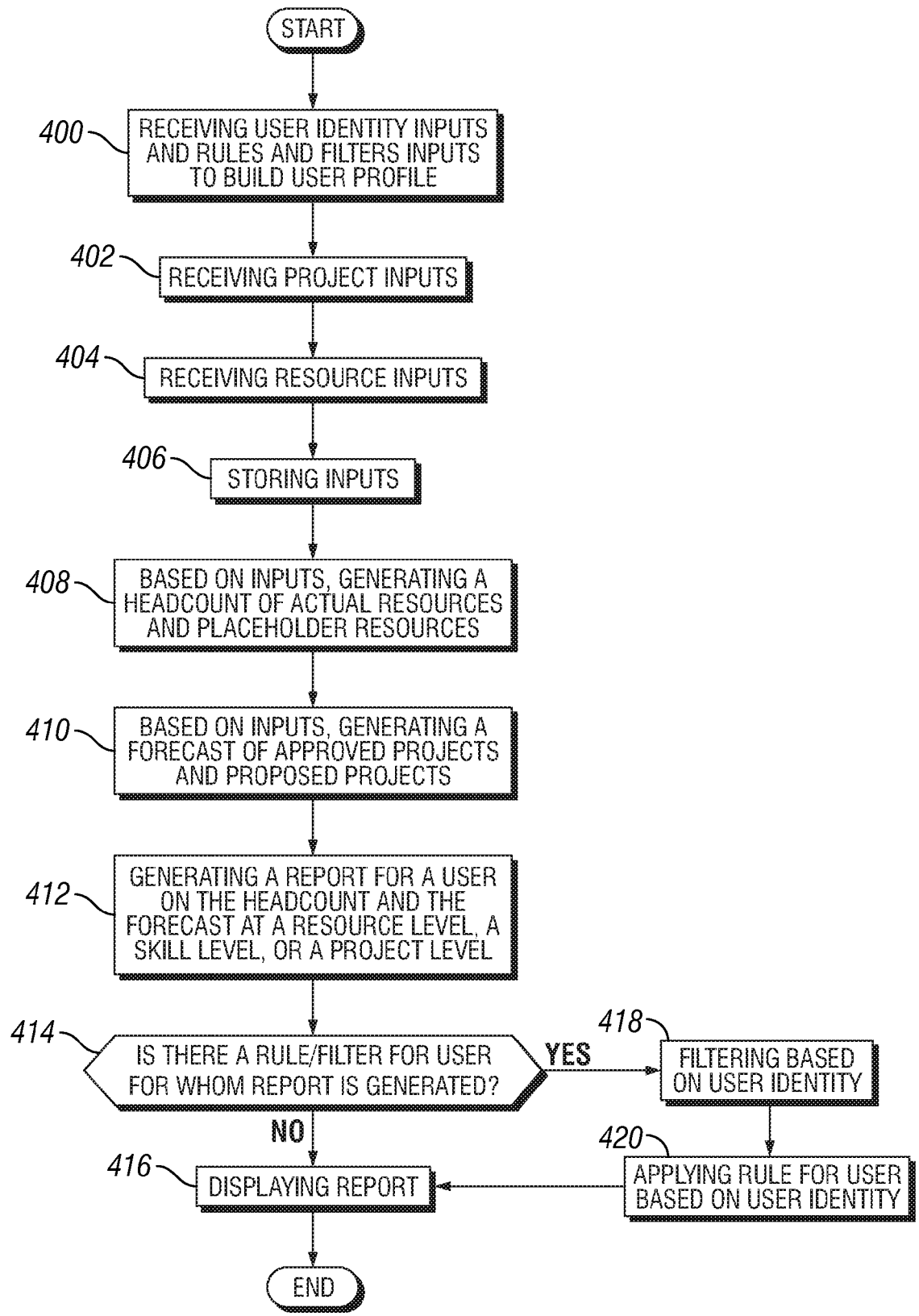
FIG. 4 shows a method of project forecast and resource forecast management integration in a computer-based system in accordance with some embodiments of the present disclosure.

FIG. 4 is a flowchart of a method for project forecast and resource forecast management integration in accordance with an embodiment of the present disclosure. The method begins by receiving the system user inputs 300 and rules and filter inputs 314 described above at the web-based GUI 102 (block 400). The system user inputs 300 and rules and filters inputs 314 together build a user profile 324. The user profile 324 may be used to identify specific data to be displayed on a screen or in a report.

Figure 5:
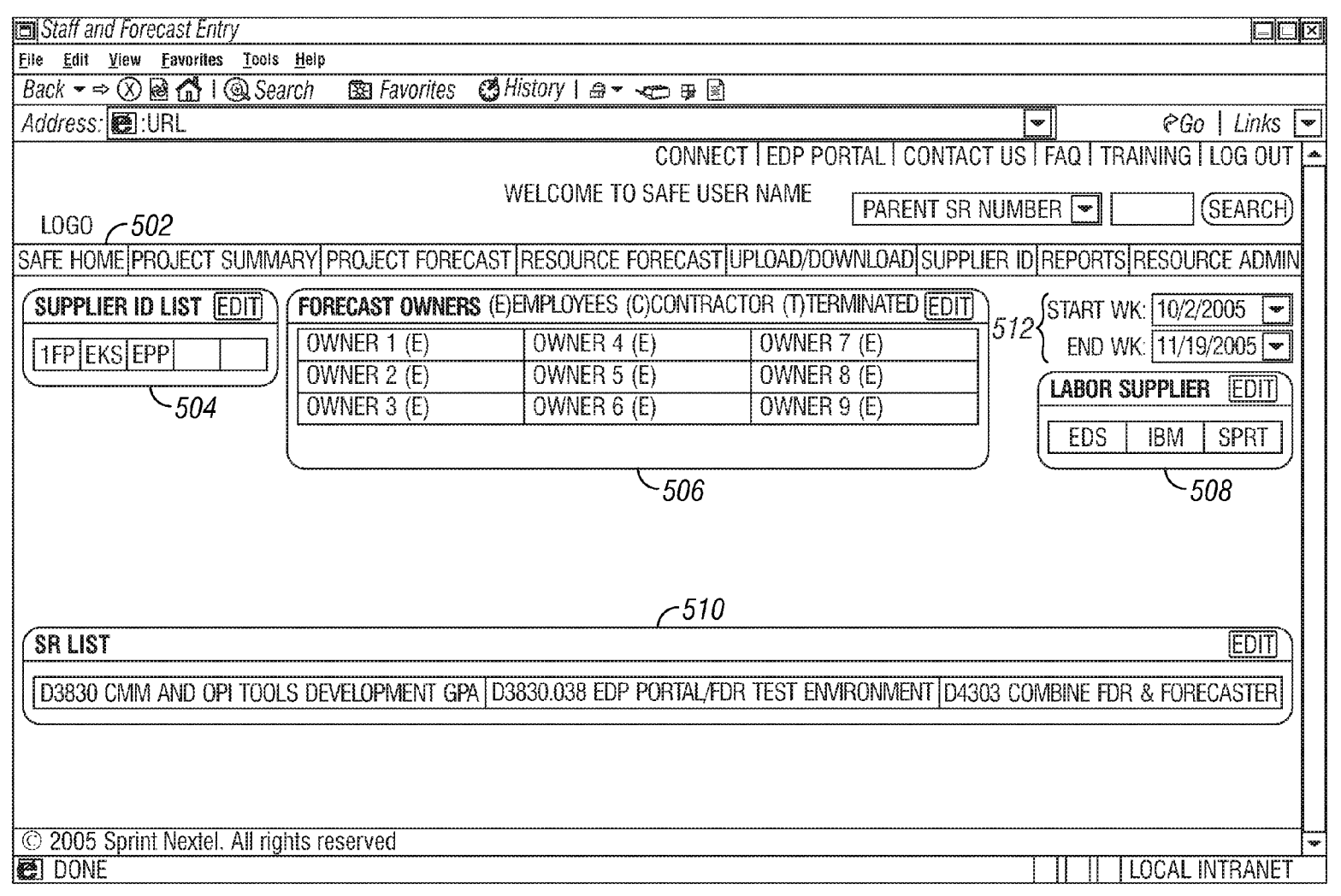

FIG. 5 is an illustrative screen shot of a screen for establishing a user profile in the tool. The user may select a "Home" link 502 to access his or her home page. The home page allows the user to edit each profile element shown (i.e., Supplier Id list 504, list of Forecast owner/providers 506, labor supplier list 508, and a list of projects 510, e.g., the SR list 510). The user may additionally select a data range to view using the start and end drop down boxes (512). By editing any of the profile elements, the user may customize the various parameters and lists for his account. After entering any changes to the profile, the user may click save. In various embodiments, changes to profiles (as well as any other changes in the system) may be batched periodically, such as every night.

Returning now to FIG. 4, the method continues with the web-based GUI 102 receiving project inputs as described above (block 402). A user may input one or many projects at a time. FIG. 6 shows an illustrative screen shot of a screen in the tool for receiving project inputs. For a given project (which may be either approved or proposed), the forecast owner/provider enters at least the detail that he has available at the time of entry (in an approved project, the forecast owner/provider will typically have all of the details; in a proposed project, the forecast owner/provider may leave one or more input fields empty). The project inputs, as shown in drop down boxes in FIG. 6, may include a project identifier 602 (a.k.a., service request or SR), a labor supplier 604 that may indicate whether the project will be worked on by enterprise employees or contract workers, a role 606 that will be needed for the project (additional roles may be added), a beginning week 608, an ending week 610, an impacted group 612 or division that may collectively have a certain skill set, a specific activity 614 (for example, programming), a forecast provider/owner 616 who is responsible for the accuracy of the planned project in the system, a number of hours 613 and an hours check box 615 indicating whether the hours entered is a total hours or weekly hours. Some of the inputs may be optional, such as the activity field 614. In various embodiments, some inputs may be required before a project may be saved in the system (such as in the case of a proposed project), such as the project identifier, a labor supplier, a role, an impacted group, and a forecast owner.

The hours check box may be left unchecked to cause a spreading algorithm to be applied to the hours input for generating the project forecast and resource forecast, such that the input hours is applied to each week in the project date range for the resource forecast and the project forecast. Alternatively the check box may be checked to cause a spreading algorithm to be applied to the hours input to divide the hours input into a weekly total, and the weekly total is applied to each week in the project date range for the resource forecast and the project forecast.

A project that is approved has completed the development process and has received feasibility and cost approvals, for example, while a proposed project is somewhere along the process of receiving approval or has had approval withdrawn or postponed. In various embodiments, there is a toggle box that indicates whether a project is approved or postponed, and in reports (discussed below), a designation may be applied (such as a font difference, a text color difference or highlighting) to show which projects are approved and which projects are proposed.

With the project in the system, a forecast owner/provider identifies and assigns the individual resources or groups of resources that will work on the project, thereby providing the details needed to generate the project forecast and resource forecast for the specific project, and thereby impacting the enterprise-wide project forecast and resource forecast. When the project inputs are entered into the tool, a screen can be displayed listing various projects and the groups working on them. The screen can show all active projects within the enterprise, only those projects under the control of a particular forecast owner/provider, or some other filtered view of the enterprise's projects (as will be discussed further below).

Returning now to FIG. 4, the method continues with the web-based GUI 102 receiving resource inputs as described above (block 404). As previously discussed, the resource inputs may be for an actual resource, such as a current employee or contractor, or may be for a placeholder resource whose hiring is anticipated. Additionally, in an embodiment, the user may assign specific skill sets needed for a role, and the tool 100 will reference the staffing data store 112 to match specific resources with the skill sets, and the generation analysis component 120 assigns the resource. In this way, the system is aware of the number of hours that individual resources with various skill sets have available to work on projects, such that work assignments may be made according to availability, all without requiring access to a separate application.

FIG. 7 shows an illustrative screen shot of a screen in the tool for creating or inputting a new placeholder resource. As shown, a placeholder resource may be associated with a supervisor 620 (who may be any actual resource in the enterprise, not only true supervisors), thereby creating a hierarchy for the placeholder resource. For example, a supervisor 620 may be selected by typing the name of an actual resource and clicking the "search" button 622 to select that resource as the supervisor 620 for the placeholder resource. Other existing placeholders 624 associated with the selected supervisor may be displayed in the screen as well, as shown in FIG. 7. With the supervisor 620 selected, the placeholder name be entered in the name fields 626. For example a last name, a first name, or both may be entered in fields 626 (if known), or any alpha numeric text may be entered in the last name 626 until more information about the identity of the placeholder resource is known. In various embodiments, an identifier of the "supervisor" will be appended to the end of the placeholder name. Using a drop down box or buttons 628 may be used to select whether the placeholder will be a contractor or employee. Additionally, if known, the projected start date 630 may be entered for the placeholder resource. Any field for the placeholder resource may be edited or updated at a later date as additional information becomes available.

An analogous screen to the screen for placeholder resources in FIG. 7 may be used to enter information for actual resources.

The inputs (project inputs, resource inputs, system user inputs and rules and filters inputs) are stored (block 406). The method proceeds as, based on the inputs, the generation analysis component 120 generates a resource forecast of actual resources and placeholder resources (block 408). Additionally, the method proceeds as, based on the inputs, the generation analysis component 120 generates a project forecast of approved projects and proposed projects (block 410). The resource forecast and project forecast generated may be created as new data, based on the most recent inputs, or may supplement and update a previously existing resource forecast and project forecast with the most recent inputs.

The method proceeds with the reporting component generating a report for a user on the resource forecast and the project forecast at a resource level, a role level, or a project level (block 412). An example of a screen of a report at a resource level is shown in FIG. 8, and an example of a screen of a report at a project level is shown in FIG. 9.

FIG. 8 is an illustrative screen shot for a report at a resource level. A project forecast and/or resource forecast at the resource level may be given as the number of working hours likely to be spent by a given resource in a working month or week, though other units of time may be used. In a preferred embodiment, reporting is done for a week at a time. The screen for entering resource inputs may allow for entry of inputs pertaining to a given resource for up to 12 months in advance, up to 24 months in advance, or some other period deemed appropriate by the enterprise. The forecast owner/provided may be permitted to enter or modify a project forecast or resource forecast up to the last day of the previous period (i.e., the last day of the previous week or month), but might be prevented from modifying a project forecast or resource forecast for the current time period (i.e., week, month, etc.).

In the example screen of FIG. 8, the report at the resource level shows one resource's forecast 700. A report at the resource level may reflect Resource Utilization. Below the resource's name in column 702 (which could be any identifier such as an employee number or code instead), each project to which he is assigned is listed (rows 704). For each project to which the resource is assigned, the project identifier in column 706 is listed along with the supplier identifier in column 708 (i.e., the group for the resource), the labor supplier in column 710 (i.e., systematically identifying whether the resource is an enterprise employee or a contractor), an identifier for a forecast owner/provider in column 712 in charge of the project, the role in column 714 of the resource in that project, any specific activities in column 716 assigned to the user (fields left blank in FIG. 8), and for each time period in column 718 (shown in each week of a two month time period), the number of hours assigned to the resource. Additionally, a total for the resource is shown (row 719).

In various embodiments, a designation is applied to show which of the resource's projects are approved and which are proposed. Here, approved projects are displayed in regular roman font (row 720), while proposed projects are displayed in italic font (row 722). Any visual designation, however, such as text color, font, highlighting, or flag indicators may be used, and selection and assignment of designation may be configured through the system. Additionally, another designation is applied to show when the resource is over or underloaded with work (not shown in FIG. 8). Here, hours may be shown in red or another alert color if causing the resource to exceed a certain number of hours, such as 40 hours per week, while if the resource is working far less than a threshold, the hours may be shown in a contrasting color, such as blue. A common threshold may be applied to each resource. Again any visual designation such as text color, font, highlighting, or flag indicators may be used, and selection and assignment of designation may be configured through the system.

Additionally, in various embodiments, the report 700 contains one or more links 724 to export the data in the report to a client application, such as Excel, such that a user may make edits or updates offline and then re-synchronize the data when on-line.

A user may select any resource in the resource level report for a report at a still further granular level, to examine the individual resource. In various embodiments, the user may have limited access to viewing only resources in his or her own hierarchy, under his or her supervision, or even just his or her own data. The limited access to which resources may be viewed may be saved as part of the user's user profile 324. In various embodiments, the resource level report defaults to display resources in a user's own hierarchy, i.e., under his or her supervision.

In a report at a role level (not shown), the hours for a particular role may be aggregated for all individual resources holding that particular role in a project, and all the resources may be displayed in the report at the role level. For example, if a forecast owner/provider estimates that a project will require 200 hours of software developer time, the report of the project forecast and/or resource forecast would not necessarily specify the number of individuals needed or the amount of time each might spend. The 200 hours could be divided among five software developers at 40 hours each, two software developers at 100 hours each, etc. Thus, each role may appear in a project forecast only once for each forecast owner/provider. If a forecast owner/provider attempts to add the same role to a project forecast more than once, an error message is displayed.

FIG. 9 is an illustrative screen shot for a report at a project level 800. A number of projects, or service requests (SRs) is shown in column 802. For each project, one or more impacted groups are shown in column 804, the labor supplier is shown in column 806 (i.e., whether the project is assigned to resources that are enterprise employees or contract workers), Level of Effort (LOE) in column 808, the Project to Date (PTD) data in column 810, the Estimate to Completion (ETC) data in column 812, the Estimate at Completion (EAC) in column 814, the Variance (VAR) in column 816, the percent Variance (VAR %) in column 818, and a reason for the Variance (VAR Reason) in column 820.

LOE in column 808 is the total amount of time estimated to be needed to complete a project and is typically derived prior to the forecasting processes described herein. A process for deriving the LOE in column 808 is described in U.S. patent application Ser. No. 10/429,615 filed May 5, 2003 and entitled "Defining and Sizing Feasible Approaches To Business Needs Within An Integrated Development Process", which is incorporated herein by reference. The Enterprise Development Process (EDP) described in that document provides an integrated environment for defining, gathering, and disseminating project-related information. The forecasting tool of the present disclosure, however, eliminates the need to interface with the EDP.

PTD in column 810 is the actual number of hours used to date on a project. The PTD value is tracked in the tool as the staffing data store 112 maintains the number of hours worked on various projects by various individuals in an enterprise. The staffing data store 112 may contain the actual number of hours worked to date as imported from a time tracking system for example.

ETC in column 812 is the estimated number of hours needed to complete a project from the current time. This value is the total of all forecasts for all roles in a project as entered into the forecasting tool by a forecast provider in the manner described above.

EAC in column 814 is an updated estimate of the number of hours that will be used when a project is complete. This value is calculated by the forecasting tool by adding the ETC in column 812 to the PTD in column 810. That is, EAC in column 814 is equal to the number of hours used on a project to date plus the number of hours estimated to be needed to complete the project.

VAR in column 816 is the amount by which the EAC in column 814 exceeds the LOE in column 808, that is, the amount by which the updated forecast varies from the original forecast. This value is calculated by the forecasting tool by subtracting the LOE in column 808 from the EAC in column 814. VAR % in column 818 is the percentage by which the EAC in column 814 exceeds the LOE in column 808. This value is calculated by the forecasting tool by dividing the VAR in column 816 by the LOE in column 808.

An enterprise might specify a tolerance on the VAR in column 816 and/or the VAR % in column 818 within which forecast owner/providers are expected to keep their forecasts. This encourages forecast owner/providers to be as accurate as possible with their forecasts. If a forecast is outside this tolerance, a forecast owner/provider might be expected to explain the discrepancy. To facilitate this, the field VAR Reason in column 820 enables the forecast owner/provider to enter in a text box or other data entry mechanism an explanation for the variance. In various embodiments, the forecast owner/provider may select the reason from a prepopulated list of reasons. The reason can be saved by the forecasting tool as an additional project input and can be viewed by users of the tool when viewing reports that include that project.

Additionally, in various embodiments, the report 800 contains one or more links 822 to export the data in the report to a client application, such as Excel, such that a user may make edits or updates offline and then re-synchronize the data when on-line.

Returning to FIG. 4, the method proceeds with a check on whether there is a rule, filter, or limit for the user for whom the report is generated (block 414). Specifically, in an embodiment, the system users data store 114 is accessed to determine the identity of the user, and the user profile 324 for that user is accessed to determine any rules, filters, preferences, limitations, etc. in place for that user, and if there are, the rules and filters or any preferences may be retrieved for that user from the system users data store 114 or the rules and filters data store 116.

If there are no rules, filters, preferences, or limitations put in place for the particular user to whom the report is displayed (at block 414), the report is displayed in the display component 106 of the GUI 102 (block 416). In various embodiments, there is a default display, for example in a project level report, that displays all projects enterprise-wide in the system, or all projects under the control of the user. In various embodiments, there is a default display, for example in a resource level report, that displays all resources in the enterprise's pool of resources, or al resources in a hierarchy under the control of the user.

If there are rules, filters, preference or limitations put in place for the particular user to whom the report is displayed (at block 414), the rule, filter, preference or limitation is retrieved from the user's user profile 324 (combining the inputs to the system user data store 114 and the rules and filter data store 116), and used to filter the report based on the user's identity (block 418), and/or apply the rule to the report based on the user's identity (block 420). Then the report may be displayed in the display component 106 of the GUI 102 (block 416).

The filters mentioned above may include various different filters applied to limit the information displayed in a report based on the identity of the user. For example, one filter may be input and applied to show only approved or proposed projects in reports. This may be useful, for example, for quickly gaining access to projects that require further approval, such as for a budgetary planning meeting. In another example, a filter may be input and applied to show only enterprise employees or contract employees. This may be useful, for example, for generating reports for the third party labor suppliers that provide contract workers. In yet another example, a filter may be input and applied to show resources forecasted past their term (i.e., contract resources that have projects assigned to them that will last longer than the period of time for which the resource was contracted). In another example, a filter may be input and applied to show terminated resources. Each of these filters may be useful, for example, for assessing whether resources should have their term extended or when new resources, or placeholder resources, will be needed.

In still another example, a filter may be input and applied to show only forecasted placeholder resources or only forecasted actual resources. A report containing only forecasted actual resources may be useful, for example, for analysis of actual hours worked versus the forecast, while a report containing only forecasted placeholder resources may provide insight to the question of how urgent hiring needs will be at a certain point in time. In an example, a filter may be input and applied to show only resources assigned to work on projects for a number of hours exceeding a certain threshold (i.e., schedule for over 40 hours, 60 hours, 80 hours, and the like). This may be useful for determining which resources are working too hard, are likely to become burned out, and when hiring or contracting for additional workers would be advisable. In another example, a filter may be input and applied to show a user a certain view based on whether he or she is the forecast owner/provider, or based on project identifier (SR), impacted group, and a selected time period. Such a filter may be useful for customizing reports for the particular user of the tool.

In an example, a filter may be input and applied to show hours spent on particular activities (i.e., by activity field) by one or more resources. Such a view may provide insight into whether actual hours worked exceed forecast, and help in assessing an accurate amount of hours for future forecasts for similar or related tasks. In yet another example, a filter may be input and applied to limit access to proprietary information by third party labor suppliers permitted access to the tool, while still providing access to data pertinent to the third party labor supplier's activities on behalf of the enterprise, thereby providing security while sharing the useful benefits of the tool to some degree with third parties whose cooperation is needed. In another example, a filter may be input and applied to limit a report to any projects currently on hold or cancelled (certain proposed projects).

In various embodiments, the use of filters may also include the ability to clear all filters for an unfiltered view, if the user has authorization to do so. For example, an entry level employee may not have authority to clear the filters and view anything he wishes in the system, while a senior manager may have the authority to do so.

The rules mentioned above may include various different rules applied to limit access or abilities to carry out certain functions in the tool based on the identity of the user. For example, one rule may be input and applied to limit which users can access/change/update/delete inputs to only 1) their own resource forecast, 2) resource forecasts for resources in their hierarchy, under their supervision, 3) only certain roles, 4) only certain impacted groups. This rule may be used to impose security, such that an entry level employee can access his own forecasts, but not alter his assignments, while his manager may do so, as well as alter the forecasts of other employees under her supervision. Another rule may be input and applied to limit access by supplier users to view/change/update/delete inputs, similarly imposing security on third party users. Still another rule may be input and applied to limit the ability to change/update/delete to the forecast owner/provider, but not other users. Applying such rules not only provides security, but also customizes the reports for each user such that he or she only sees the information useful and pertinent to him or her in the particular role in which they serve.

Another rule may be input and applied to limit access to view/update/change/delete inputs according to role. Still another rule may be may be input and applied to limit access according to enterprise hierarchy (for example, to permit only middle to upper management access to certain information or reports in the tool).

In various embodiments, the tool additionally includes the capability to record and subsequently review a log recording the user id and a time stamp for any changes or updates or deletes to various inputs fields.

As a security measure, a forecast owner/provider can be limited to entering inputs only for projects or resources for which he or she has been authorized. When a forecast owner/provider is displayed a screen displaying data for a project or resource for which he or is authorized, a link or button allowing him or her to enter inputs can be present. When a forecast owner/provider is displayed a screen displaying data for a project or resource for which he is not authorized, this link or button can be absent. In this case, the forecast owner/provider might be allowed to view, but not edit, the project forecasts and resource forecasts made by others. Authorization can be performed through a login procedure used to login to the system or access the input entry screen.

As mentioned above, the entry of data into the forecasting tool can be accomplished through a feature in which a link on a web page is selected and a text input element then appears on the page in place of the link. The text input element might be a text box, a drop-down list, or some other means of data entry. When a user enters data into the text input element, the text input element disappears and the entered data appears as a link in the position where the original link appeared.

The original link is defined in an anchor tag in an HTML document. The value displayed in the link is the tag's label value and can be referred to as the anchor tag element. This value is also contained in the HTML document as a hidden input element. When the link is selected, a JavaScript function called get_input is called through the onClick attribute of the anchor tag. The anchor tag element and the hidden input element are passed as arguments of this function and the value of the hidden input element is read and stored.

A text input element is then created using the standard DOM API provided by the web browser and the value of the hidden input element is transferred into the text input element. Various attributes of the anchor tag are saved for later use. A JavaScript function is then created that will allow the original link and its anchor tag element to reappear if the focus is shifted away from the text input element. Another JavaScript function is created that allows movement of the text input element to the next anchor tag when a user presses the Enter key.

The input focus for the screen is set on the text input element and the value in the text input element can be selected or highlighted to draw a user's attention to it and to allow immediate data entry. The user then types or chooses the data to be entered and enters the data by either pressing the Enter key or by clicking elsewhere on the screen. If Enter is pressed, a new text input element is created in the manner described above at the location of the next anchor tag. The entered data is validated and the validated data replaces the original hidden input element. The DOM API is used to create a new anchor tag element with the same value as the new hidden input element. The text input element is then replaced with a link with the value of the new anchor tag element.

Figure 10:
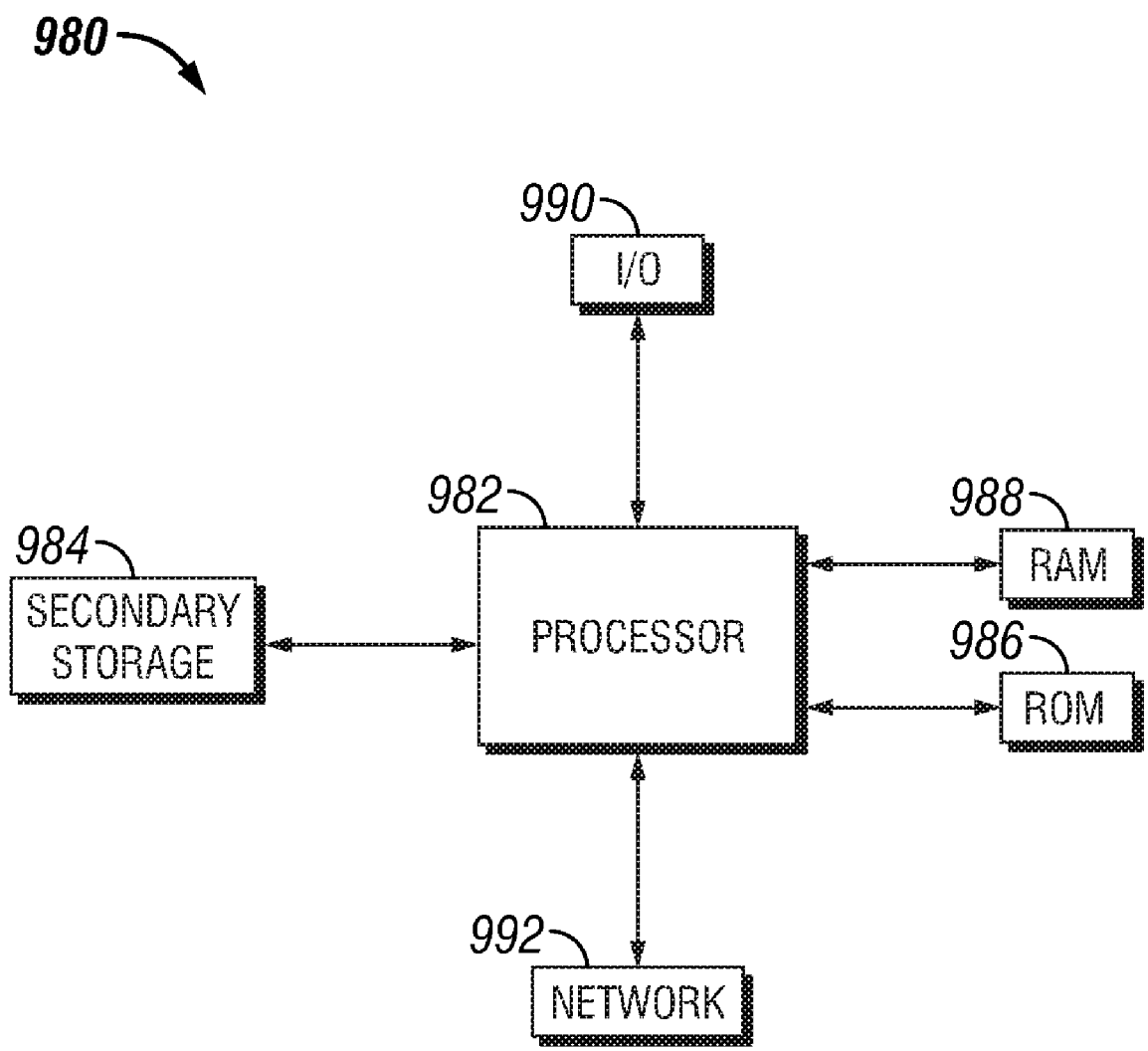
FIG. 10 shows an illustrative general purpose computer system suitable for implementing, at least in part, the several embodiments of the disclosure.

The present disclosure for project forecast and resource forecast management integration may be implemented, at least partially, on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, reads only memory (ROM) 986, random access memory (RAM) 988, input/output (I/O) 990 devices, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are reads during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O 990 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 992 devices may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity 992 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for project forecast and resource forecast management integration in an enterprise, the system comprising:
    a web-based Graphical User Interface (GUI) including an input component and a display component, wherein the input component receives project inputs relating to approved projects and proposed projects, wherein the project inputs comprise for each project a scheduled timeframe, an hours input, and a flag that indicates whether the project is approved or proposed, wherein the hours input further comprises a project total and a project date range, the proposed projects are projects that have entered a project management and development process but have not obtained final approval, and wherein the input component further receives resource inputs relating to actual resources and placeholder resources, wherein the placeholder resources are resources that the enterprise does not possess that are anticipated to be acquired by the enterprise;

a generation/analysis component that, based on the received inputs, generates a resource forecast of actual resources and placeholder resources, and generates a project forecast of approved projects and proposed projects, wherein the resource forecast includes resource assignment and availability for a given time period for both the actual resources and the placeholder resources, wherein the project forecast comprises a project management plan that includes an assignment of the actual resources and the placeholder resources to the approved projects and the proposed projects, the hours assigned for completion of the approved projects, the hours assigned for completion of the proposed projects, and scheduling for work on the approved projects and on the proposed projects, and wherein the generation/analysis component applies a spreading algorithm to the hours input to divide the hours input into a total for each time unit in the project date range for the resource forecast and the project forecast, wherein the time unit comprises one of a week, a month, a quarter, and a year; and a reporting component that generates a report on the resource forecast and the project forecast for display in the display component of the GUI, the reporting component generating the report at each of a resource level, a role level, and a project level, the reporting component applies a designation to distinguish approved projects from proposed projects in the resource forecast and the project forecast, and the reporting component applies a designation to distinguish actual resources from placeholder resources in the resource forecast and the project forecast;

wherein the reporting component comprises a filter component and a rules component, wherein the filter component filters the report on the resource forecast and the project forecast according to an identity of a user of the GUI and prevents access by a third party labor supplier to enterprise proprietary information, and wherein the rules component limits access to the reported resource forecast and project forecast according to the identity of the user, provides access to data pertinent to the third party labor supplier, and limits access by the third party labor supplier to view, change, update, and delete inputs to only projects or resources for which the third party labor supplier is authorized.

2. The system of claim 1, wherein the project inputs further comprise for each project a Project Identifier, one or more Impacted Skill Group(s), and one or more specific activity fields.

3. The system of claim 2 wherein the hours input further comprises a weekly total and a project date range; wherein the generation/analysis component applies a spreading algorithm to the hours input, and the input hours is applied to each week in the project date range for the resource forecast and the project forecast.

4. The system of claim 2, wherein the resource inputs comprise for each resource a Resource Identifier, one or more Skill Set(s), an hours input, and a flag that indicates whether the resource is actual or placeholder.

5. The system of claim 1, wherein the resource forecast and project forecast generated is one of weekly, monthly, quarterly, and annually, per a selection entered in the GUI.

6. The system of claim 1, wherein the reporting component generates the report for the resource level, the role level, and the project level.

7. A method for project forecast and resource forecast management integration in an enterprise, the method comprising:

receiving at a web-based GUI a plurality of inputs, wherein the inputs comprise project inputs relating to approved projects and proposed projects that have entered a project management and development process but have not obtained final approval and resource inputs relating to actual resources and placeholder resources, wherein the project inputs comprise for each project a scheduled timeframe, an hours input, and a flag that indicates whether the project is approved or proposed, wherein the hours input further comprises a project total and a project date range, and wherein the placeholder resources are resources that the enterprise does not possess that are anticipated to be acquired by the enterprise;

based on the received inputs, generating, by a processor, a resource forecast of actual resources and placeholder resources, wherein the resource forecast includes resource assignment and availability for a given time period for both the actual resources and the placeholder resources;

based on the inputs, generating, by a processor, a project forecast of approved projects and proposed projects, wherein the project forecast comprises a project management plan that includes an assignment of the actual resources and the placeholder resources to the approved projects and the proposed projects, the hours assigned for completion of the approved projects, the hours assigned for the completion of the proposed projects, and scheduling for work on the approved projects and the proposed projects, applying a spreading algorithm to the hours input to divide the hours input into a total for each time unit in the project date range for the resource forecast and the project forecast, wherein the time unit comprises one of a week, a month, a quarter, and a year;

generating, by a processor, a report on the resource forecast and the project forecast for each one of a resource level, a role level, and a project level, wherein the report includes a designation to distinguish approved projects from proposed projects in the resource forecast and the project forecast, and the report includes a designation to distinguish actual resources from placeholder resources in the resource forecast and the project forecast; and displaying a filtered report in the web-based GUI wherein the resource forecast and the project forecast are filtered according to an identity of a user of the GUI and according to rules that prevents access by a third party labor supplier to enterprise proprietary information, and wherein the rules limits access to the reported resource forecast and project forecast according to the identity of the user, provides access to data pertinent to the third party labor supplier, and limits access by the third party labor supplier to view, change, update, and delete inputs to only projects or resources for which the third party labor supplier is authorized.

8. The method of claim 7, wherein the project inputs comprise for each project a Project Identifier, a scheduled timeframe, one or more Impacted Skill Group(s), an hours input, one or more specific activity fields, and a flag that indicates whether the project is approved or proposed.

9. The method of claim 7, wherein the hours input further comprises a project total and a project date range, and wherein the generation/analysis component applies a spreading algorithm to the hours input to divide the hours input into a weekly total, and the weekly total is applied to each week in the project date range for the resource forecast and the project forecast.

10. The method of claim 8, wherein the resource inputs comprise a Resource Identifier, one or more Skill Set(s), an hours input, and a flag that indicates whether the resource is actual or placeholder.

11. The method of claim 7, applying a designation to distinguish approved projects from proposed projects in the resource forecast and the project forecast.

12. The method of claim 11, applying a designation to distinguish actual resources from placeholder resources in the resource forecast and the project forecast.

13. The method of claim 7, wherein the resource forecast and project forecast generated is one of weekly, monthly, quarterly, and annually, per a selection entered in the GUI.

14. The method of claim 7, further comprising accepting a toggle to convert a first project from approved to proposed, or proposed to approved, without clearing any inputs for the first project; and applying a designation to distinguish between approved projects and proposed projects in the resource forecast and the project forecast.

15. The method of claim 7, further comprising generating the report for the resource level, the role level, and the project level.

16. The method of claim 12, further comprising changing the designation for a particular resource from a placeholder resource to actual resource when a toggle input is received.

* * * * *